(12) United States Patent
Todd

(10) Patent No.: US 12,158,954 B2
(45) Date of Patent: Dec. 3, 2024

(54) INCREASING CONFIDENCE SCORES VIA DCF EQUATION MAPPING AND AUTOMATED STREAM INSPECTION

(71) Applicant: EMC IP Holding Company LLC, Hopkinton, MA (US)

(72) Inventor: Stephen J. Todd, North Andover, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 312 days.

(21) Appl. No.: 17/082,825

(22) Filed: Oct. 28, 2020

(65) Prior Publication Data

US 2022/0129555 A1    Apr. 28, 2022

(51) Int. Cl.
| | | |
|---|---|---|
| G06F 21/57 | (2013.01) | |
| G06F 16/903 | (2019.01) | |
| G06F 17/11 | (2006.01) | |

(52) U.S. Cl.
CPC ........ G06F 21/57 (2013.01); G06F 16/90335 (2019.01); G06F 17/11 (2013.01)

(58) Field of Classification Search
CPC ..... G06F 21/57; G06F 16/90335; G06F 17/11
USPC ......................................................... 726/27
See application file for complete search history.

(56) References Cited

U.S. PATENT DOCUMENTS

| | | | | |
|---|---|---|---|---|
| 9,727,591 | B1* | 8/2017 | Sharma | G06F 8/71 |
| 2002/0087744 | A1* | 7/2002 | Kitchin | G06F 8/20 |
| | | | | 719/331 |
| 2004/0181670 | A1* | 9/2004 | Thune | G06F 21/6263 |
| | | | | 713/176 |
| 2006/0294151 | A1* | 12/2006 | Wong | G06F 16/25 |
| 2010/0235112 | A1* | 9/2010 | Kesler | G06Q 10/04 |
| | | | | 702/35 |
| 2019/0139576 | A1* | 5/2019 | Delaney | G06V 20/46 |
| 2019/0287680 | A1* | 9/2019 | O'Connor | G06F 16/90335 |
| 2021/0133349 | A1* | 5/2021 | Jensen | G06F 16/215 |
| 2021/0158074 | A1* | 5/2021 | Wray | G06Q 10/1053 |

OTHER PUBLICATIONS

Feng, "A Trust Evaluation Algorithm for Wireless Sensor Networks Based on Node Behaviors and D-S Evidence Theory", 2011, MDPI, pp. 1346-1358 (Year: 2011).*

* cited by examiner

*Primary Examiner* — Piotr Poltorak
*Assistant Examiner* — Gregory A Lane
(74) *Attorney, Agent, or Firm* — Workman Nydegger

(57) ABSTRACT

One example method includes receiving a data stream at a node of a data confidence fabric that comprises a group of nodes that are each operable to assign trust metadata to data of the data stream, inspecting the data stream to determine a data type of data in the data stream, accessing a configuration file that applies to all the nodes of the data confidence fabric, and obtaining an equation from the configuration file, mapping the equation to the data, performing a trust insertion process on the data, as specified in the equation, and generating trust metadata that is associated with the data and based on the trust insertion process.

18 Claims, 14 Drawing Sheets

| CODE TYPE | CONDUCTORS ALLOYS (+/-) | SENSING TEMPERATURE | SENSITIVITY (μV/°C) |
|---|---|---|---|
| E | NICKEL CHROMIUM / CONSTANTAN | -40 TO 900°C | 68 |
| J | IRON / CONSTANTAN | -180 TO 800°C | 55 |
| K | NICKEL CHROMIUM / NICKEL ALUMINUM | -180 TO 1300°C | 41 |
| N | NICROSIL / NISIL | -270 TO 1300°C | 39 |
| T | COPPER / CONSTANTAN | -250 TO 400°C | 43 |
| R/S | COPPER / COPPER NICKEL COMPENSATING | -50 TO 1750°C | 10 |
| B | PLATINUM RHODIUM | 0 TO 1820°C | 10 |

FIG. 3

TYPICAL TEMPERATURE SENSOR CHARACTERISTICS

| TYPICAL CHARACTERISTICS | THERMISTORS GENERAL PURPOSE | RESISTANCE TEMPERATURE DEVICES (RTDs) | THERMOCOUPLES (TCs) | SEMICONDUCTOR TEMPERATURE SENSORS |
|---|---|---|---|---|
| TEMPERATURE RANGE | -55°C TO +125°C | -200°C TO +850°C | -600°C TO +2000°C | -50°C TO +150°C |
| LINEARITY | EXPONENTIAL | FAIRLY LINEAR | FAIRLY LINEAR | BEST |
| SENSITIVITY | HIGH | LOW | MEDIUM | HIGHEST |
| RESPONSE TIME | FAST | SLOW | FAST TO SLOW (DEPENDS ON CONSTRUCTION) | SLOW |
| EXCITATION OR POWER | NEEDED | NEEDED | NOT NEEDED | NEEDED |
| LONG-TERM STABILITY | LOW | HIGH | HIGH | MEDIUM |
| SELF-HEATING | YES | YES | NO | YES |
| COST | LOW | LOW (FILM) HIGH (WIRE WOUND) | MODERATE TO HIGH (DEPENDS ON CONSTRUCTION) | LOW TO MODERATE |

FIG. 4

| Sensor Type | Equation |
|---|---|
| Temperature | "TPM Signature" + "Data Provenance" + "Authentication" + "Semantic Validation" + "Immutable Storage" |
| Proximity | "Encryption" + "GPS augmentation" + "Semantic Validation" |
| Pressure | "GPS augmentation" + "Immutable Storage" + "Semantic Validation" + "range check" |
| Water quality | "Model Conversion" + "SD-Wan transfer" + "2-factor-auth" + "Authentication" |
| Chemical | "Data Provenance" + "SD-Wan" + "encryption" + "Timestamping" |
| Gas | "Authentication" + TPM Signature" + "Model Conversion" + "range check" |
| Smoke | "2-factor-auth" + "GPS augmentation" + "Data Provenance" |
| Infrared | "ASIC acceleration" + "Time-sensitive=networking" + "Immutable storage" |
| Level | "Semantic Validation" + "GPS augmentation" |
| Image | "Image Recognition" + "Data Provenance" + "Compression" |
| Motion | "Model Conversion" + "SD-Wan transfer" + "Authentication" |
| Accelerometer | "GPS augmentation" + "Data Provenance" |
| Gyroscope | "Encryption" + "GPS augmentation" + "Semantic Validation" |
| Humidity | "GPS augmentation" + "Immutable Storage" + "Semantic Validation" + "range check" |
| Optical | "GPS augmentation" + "Data Provenance" |
| Unknown | ("GPS augmentation" + "Data Provenance" + "2-factor auth") / 10 |

FIG. 6

| Sensor Type | Equation |
|---|---|
| Temperature | "TPM Signature" + "Data Provenance" + "Authentication" + "Semantic Validation" + "Immutable Storage" |
| Proximity | "Encryption" + "GPS augmentation" + "Semantic Validation" |
| Pressure | "GPS augmentation" + "Immutable Storage" + "Semantic Validation" + "range check" |
| Water quality | "Model Conversion" + "SD-Wan transfer" + "2-factor-auth" + "Authentication" |
| Chemical | "Data Provenance" + "SD-Wan" + "encryption" + "Timestamping" |
| Gas | "Authentication" + "TPM Signature" + "Model Conversion" + "Data Provenance" |
| Smoke | "2-factor-auth" + "GPS augmentation" + "Semantic Validation" + "range check" |
| Infrared | "ASIC acceleration" + "Time-sensitive-networking" + "Immutable storage" |
| Level | "Semantic Validation" + "GPS augmentation" |
| Image | "Image Recognition" + "Data Provenance" + "Compression" |
| Motion | "Model Conversion" + "SD-Wan transfer" + "Authentication" |
| Accelerometer | "GPS augmentation" + "Data Provenance" |
| Gyroscope | "Encryption" + "GPS augmentation" + "Semantic Validation" |
| Humidity | "GPS augmentation" + "Immutable Storage" + "Semantic Validation" + "range check" |
| Optical | "GPS augmentation" + "Data Provenance" + "2-factor auth" |
| Unknown | ("GPS augmentation" + "Data Provenance") / 10 |

702

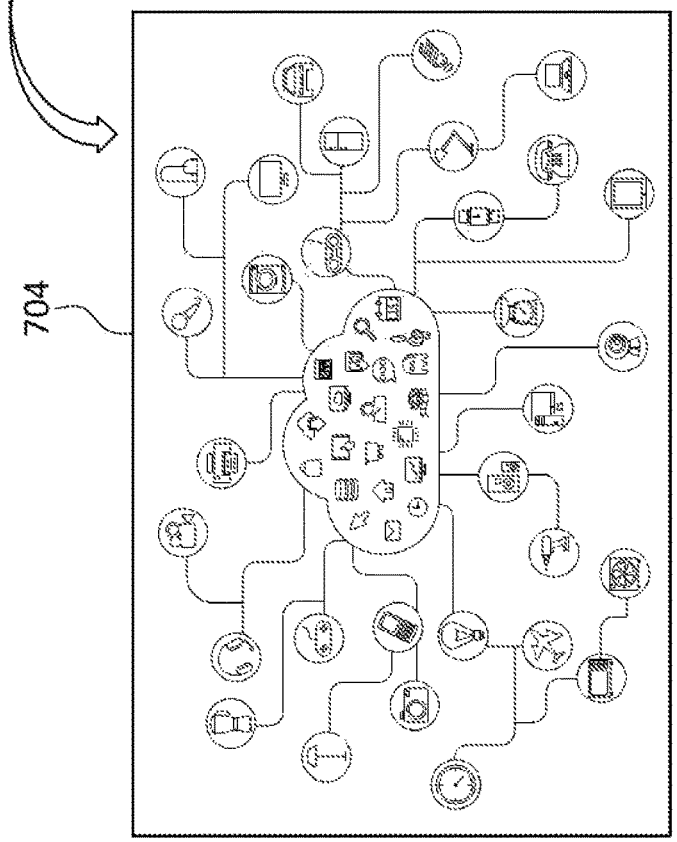

INCREASING CONFIDENCE SCORES VIA DCF EQUATION MAPPING AND AUTOMATED STREAM INSPECTION

FIELD OF THE INVENTION

Embodiments of the present invention generally relate to data confidence fabrics (DCF). More particularly, at least some embodiments of the invention relate to systems, hardware, software, computer-readable media, and methods for configuring a DCF that is able to manage and use data streams from disparate types of devices, such as IoT sensors.

BACKGROUND

A DCF may have a large number, and variety, of data generating devices. Due to the wide variety in the types of devices employed, it may be necessary, for example, for the DCF to use a different configuration file for each different type of device. Not only is it difficult to manage a large number, and types, of configuration files, but the use of such a variety of configuration files may hamper, if not defeat, the ability of the DCF to generate confidence measurements. This is a concern because one of the purposes of a DCF is to reliably and effectively assign confidence metadata to a stream of device data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses various alloy types that may be used in a data generator in the form of a thermocouple.

FIG. 4 discloses differences in sensor (thermostat) characteristics by type.

FIG. 6 discloses a trust insertion process equation mapping scheme.

FIG. 7 discloses the use of a single, equation-based, configuration file deployed across all nodes of a DCF.

DETAILED DESCRIPTION OF SOME EXAMPLE EMBODIMENTS

Figure 1:
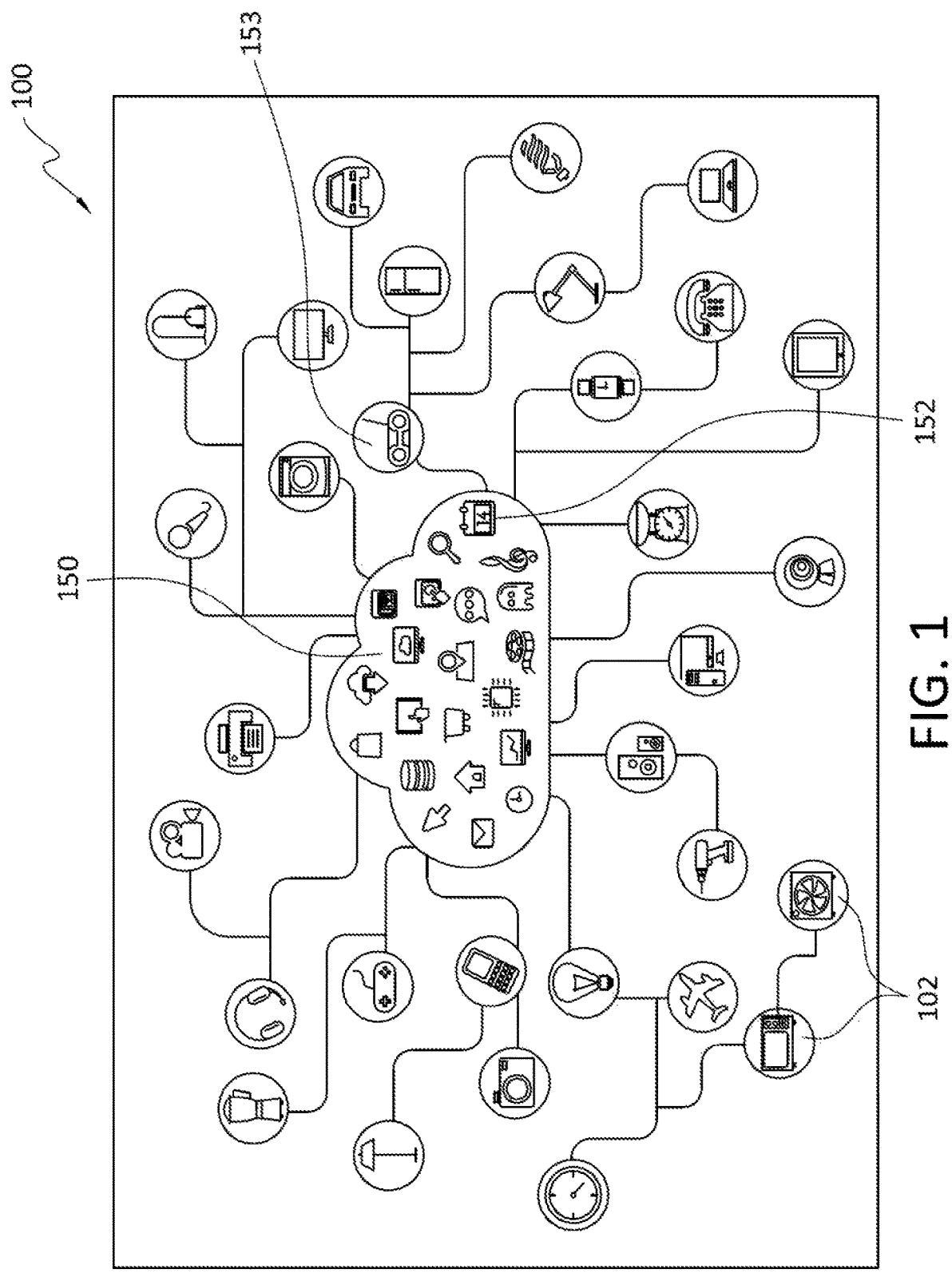
FIG. 1 discloses an example of the disparity of number and types of data generators in a DCF.

Embodiments of the present invention generally relate to data confidence fabrics (DCF). More particularly, at least some embodiments of the invention relate to systems, hardware, software, computer-readable media, and methods for configuring a DCF that is able to manage and use data streams from disparate types of devices, such as IoT sensors for example.

In some embodiments, this may be accomplished through the use of common equation-based configuration files for the data generating devices of the DCF. An equation mapping table may be employed that includes respective equations for each of various types of DCF data generators. When a DCF node, such as a gateway for example, receives data from a particular type of device, the DCF node may consult the mapping table to identify the equation that specifies how data from that device type should be handled in terms of the confidence evaluation of that data, and the assignment of confidence metadata to that data based on the evaluation. Where a device type is unrecognized by the DCF node, the mapping table may specify a default equation for unrecognized device types.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a DCF may employ an equation based approach to data categorization and evaluation that enables handling and evaluation of respective data streams generated by a group of disparate data generators. In an embodiment, data from unknown device types may be evaluated for trust by a DCF. An embodiment of the invention may eliminate the need to create device specific configuration files for each device type in a DCF. An embodiment may effect trust insertion in a DCF even where the DCF comprises a group of disparate device types.

A. Overview

In general, a Data Confidence Fabric (DCF) may annotate trust operations as data flows through the fabric, resulting in a confidence score derived from the annotations. Example embodiments may assign DCF equations to specific types of devices and data streams, and may implement the trust technologies that are identified in those equations using techniques such as stream inspection and dynamic trust insertion.

Embodiments of the invention may be employed in connection with a DCF, one example of which is denoted at 100 in FIG. 1. As indicated, the DCF 100 may include a large number of data generators 102, and the data generators 102 may be any of a wide variety of different types. In general, one or more of the data generators 102 may generate data that may be stored and/or processed, such as in a cloud storage and computing environment for example. The DCF 100 is one example operating environment for embodiments of the invention, and the DCF 100 may, or may not, be integrated together, or be a part of, a cloud computing environment 150 in which one or more cloud applications 152 may run.

In the illustrative example of FIG. 1, a DCF 100 may thus have a multi-tiered structure in which, for example, the first tier comprises one or more data generators 102, the second tier comprises one or more gateways 153 with which one or more data generators 102 may, but do not necessarily, communicate, and the third tier may comprise the cloud computing environment 150. Other DCF 100 structures are also possible. For example, in another embodiment, multiple tiers of gateways may be employed, in which a lower tier gateway may communicate data to a gateway in a higher level tier. More generally, a DCF may have any number of tiers, and the foregoing configurations are presented only by way of example and not limitation.

In some embodiments, one or more of the data generators 102 may be IoT devices, but that is not necessarily required. In some embodiments, one or more of the generators 102 may be sensors that are able to detect, and report on, a physical attribute of a physical environment, although it is not required that a data generator 102 be a sensor. One or more of the data generators 102 may comprise an edge device operating in an edge computing environment, although the data generators 102 need not be configured, nor operate, in this way.

By way of illustration, some example data generators 102 may include sensors configured to monitor, and report on, atmospheric attributes such as, but not limited to, temperature, proximity, sound, vibration, pressure, water quality, chemicals, gas, smoke, infrared, level, images, motion, acceleration, velocity, gyroscopic attributes such as position and attitude, roll, pitch, yaw, humidity, and optical phenomena. This is not an exhaustive list of sensor types, and any other sensor types may be employed in embodiments of the invention. As exemplified by this list, and the example DCF 100 of FIG. 1, a DCF may be quite complex and extensive in terms of the types and numbers of data generators 102 that may be employed.

Because each of the data generators 102 may have a different respect format, and other attributes, for the data that it generates, it can be challenging for the DCF 100 to ingest and process the data from the various data generator 102 types. This problem is further aggravated when a large number of data generators 102 are present in a DCF.

Still another challenge concerns the trustworthiness of both the data generators 102, and the data that they generate. Because one or more applications, such as in a cloud computing environment for example, may need access to the data for analysis and other purposes, such applications may require some type of assurance that the data is trustworthy, not only in terms of its accuracy, but in terms of the source from which the data originated. The problem of trust becomes increasingly complex with greater numbers, and types, of data generators 102 and respective data formats. Some particular challenges are addressed in the following discussion.

Figure 2:
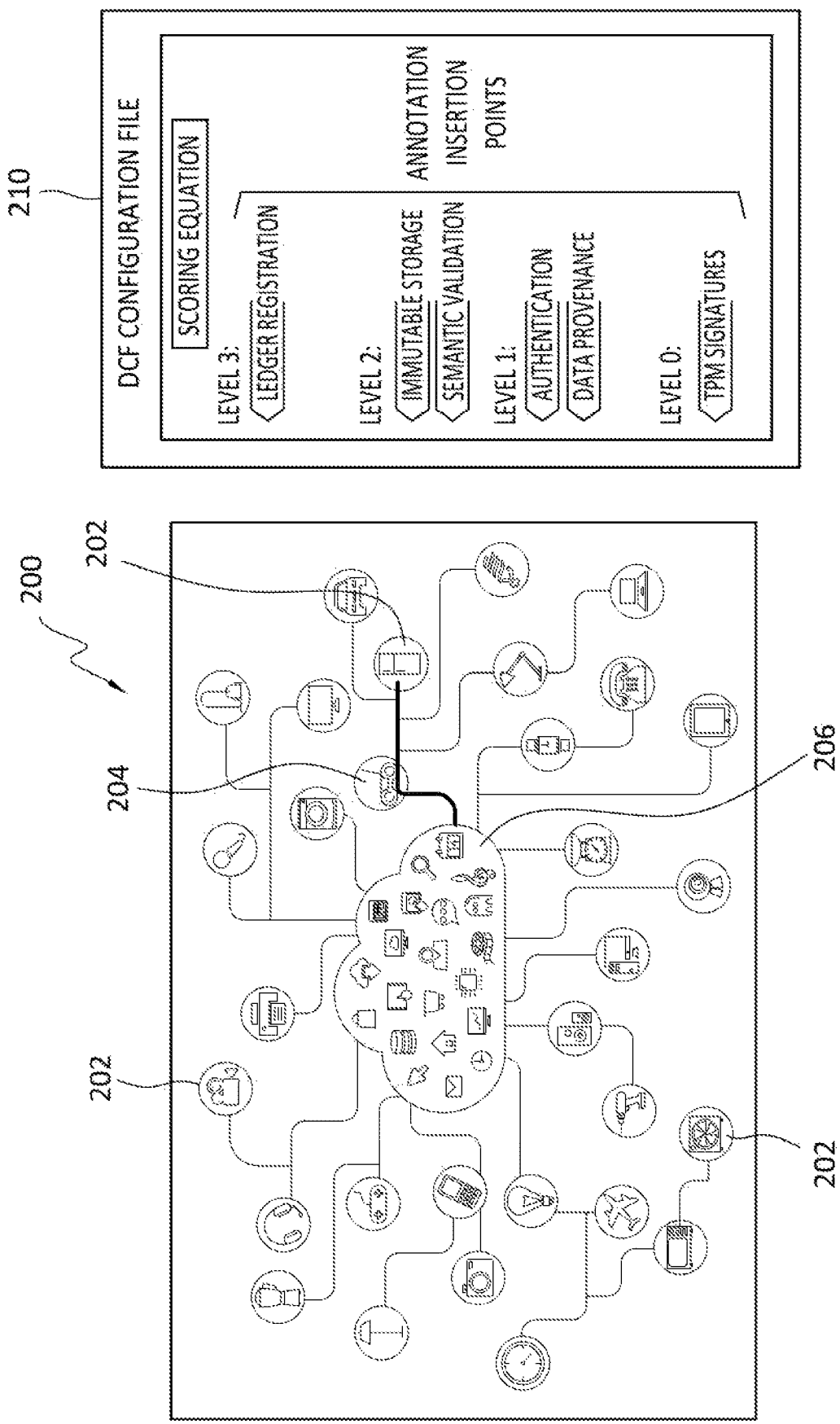
FIG. 2 discloses aspects of an example DCF that includes a data generator in the form of a refrigerator.

With reference now to FIG. 2, an example DCF 200 is disclosed that includes a number of various types of data generators 202, one of which, in this illustrative example, is a refrigerator. Data generated by, and/or at the direction of, the refrigerator may be directed by the refrigerator to a gateway 204 and into an application running in a cloud environment 206. The path indicated in FIG. 2 illustrates that as data, such as the internal temperature, is transmitted from the refrigerator, that data is subjected to five different trust analysis and insertion processes in which one or more DCF nodes through which the data passes append respective trust information, such as trust metadata, to the data. These processes, which may be specified in the refrigerator-specific configuration file 210, may be as follows.

As shown at Level 0 of the example configuration file 210, the temperature device in the refrigerator must have a TPM (Trusted Platform Module) chip which signs the temperature reading transmitted by the refrigerator with a unique private key. Next, a CPU (Central Processing Unit) within the refrigerator performs two additional levels of trust insertion, namely, insertion of Data Provenance information about the refrigerator (such as refrigerator vendor, refrigerator make/model, and refrigerator serial number, for example) that must be attached to the temperature reading transmitted by the refrigerator, and the refrigerator must also perform Authentication against any client application that wishes to inspect the refrigerator telemetry. The data transmitted by the refrigerator may next pass through the gateway 204, previously authenticated, which performs two additional trust insertion processes with respect to the data. In this particular example, the gateway 204 may perform a Semantic Validation of the data so as to determine, for example, whether the data is potentially an outlier, or outside a range of valid readings. As well, in this example, the gateway 204 may provide Immutable Storage by storing the data locally on the gateway 204 in a tamper-proof location.

As the data passes from the refrigerator to an application in the cloud environment 206, trust metadata from all five trust insertion operations travels with the data, that is, respective trust metadata may be appended to, or otherwise accompany, the data by each node through which the data passes on its journey from the refrigerator to the application. In this example, an equation, which may be specified in the configuration file 210, calculates a total confidence score for the data. In some cases, the total confidence score may be a sum of the scores respectively assigned by each of the nodes that inserted trust metadata. After the confidence score is calculated, Ledger Registration may be performed, which may involve creation of a ledger entry, and insertion of the ledger entry in a ledger. The ledger entry may hold, for example, the confidence score, the trust insertion metadata, and a pointer to the event data. The approach just described may thus enable an application to process the data with a level of confidence that the data originated from a reliable source, and that a particular chain of custody of the data was maintained during the time the data was in transit from the refrigerator to the application.

As noted above, an equation may be used to calculate a confidence score for the data. For example, and with continued reference to FIG. 2, a Confidence Score (CS) may be calculated thus:

$$CS = \text{``TPM Signature''} + \text{``Data Provenance''} + \text{``Authentication''} + \text{``Semantic Validation''} + \text{``Immutable Storage''}$$

In this example, the CS is simply a summation of scores gathered during the execution of the trust insertion components. For example, if all five operations executed properly, and each component returned a confidence level of "2", then a "perfect 10" could be achieved. However, if Semantic Validation failed, for example, a maximum score of "8" would be achieved.

With the example of FIG. 2 in view, it can be appreciated that various problems and complexities may arise when attempting to implement such an approach in an ecosystem involving a large number of data generators of various types, and a large number of applications that may potentially consume data from the data generators. Some examples of such problems and complexities are discussed below.

A first problem concerns the likely unmanageable number of DCF config files that would be needed to configure and run a DCF with a large variety and number of data generators. That is, the number of permutations related to sensor data, which could involve tens of thousands of sensor types with thousands of different data formats, means that an administrator could potentially be managing thousands of different DCF configuration files and attempting to map the proper DCF configuration to the proper sensor. Such unmanageability can manifest itself in different ways, as illustrated by the following examples.

Consider, for example, the various different implementations of a "thermostat" sensor type. Example devices that may implement a thermostat function include thermocouples, resistor-based devices, thermistors, and semiconductor-based devices. Moreover, within the respective context of each different type of thermostat, a variety of different metal alloys may be employed in the construction of the sensor. For example, and with reference now to FIG. 3, a table 300 is disclosed that lists the different types of alloys that may be used to build a thermostat sensor using a thermocouples approach. Thus, for just a single type of thermocouple, which is but one example of a thermostat, at least 7 different metal alloys may be used to construct the thermocouple. It can thus be seen that over a large population of sensors, which may have widely differing characteristics, the number of configuration files, for example, that would have to be employed could be quite large.

As well, another problem that such a variety of materials may introduce, such as from a data ingestion perspective, is that application confidence in the data from any given thermostat depends on the manufacturing materials used to implement the sensor. For example, and with reference to the data of the table 300, copper has the smallest range of measurement, and nickel chromium has the highest sensitivity, that is, the ability to generate a voltage in response to temperature change. Such variation in capabilities due to sensor differences may make it difficult to configure a DCF in a way that the DCF will produce useful and reliable data.

With continued reference to the example of a thermostat as a data generator, and referring now to the table 400 in FIG. 4, it can be seen that different thermostats may have widely varying characteristics, and some thermostats may have characteristics that other thermostats do not have. For example, a Temperature Range of a Thermocouple may be significantly larger than a Temperature Range of a Semiconductor Temperature Sensor. Likewise, the Sensitivity may vary widely among Temperature Sensor types. Such variability in sensor characteristics may be problematic in the context of a DCF. For example, sensor Response Time in a time-critical manufacturing environment may be an important trust metric when calculating an overall confidence score. But a data ingest platform typically does not have the ability to measure response time, and the data stream coming from the device does not contain that detail either. Thus, calculating confidence for the DCF data may be challenging, given these disparities. Note that FIG. 4 discloses only one type of sensor (a thermostat) with four different implementations, each possessing different types of characteristics per implementation. As might be expected, and illustrated by the data of the table 300, trust insertion and data trustworthiness become increasingly problematic as the number and variety of data generators in a DCF increase.

Unknown data generator types may introduce problems as well. For example, gateway data ingest software may support a wide number of protocols to connect to a wide variety of sensors or other data generators. A gateway may receive unsolicited data streams from a new device and may be unaware of the type of data generator that sent the data stream. If the type of data generator is unknown, it may not be possible to assign a confidence score to the data generated by that data generator. As a result, such data may end up in an analytics environment and either be erroneously used, or stored and ignored in a wasteful fashion.

Figure 5:
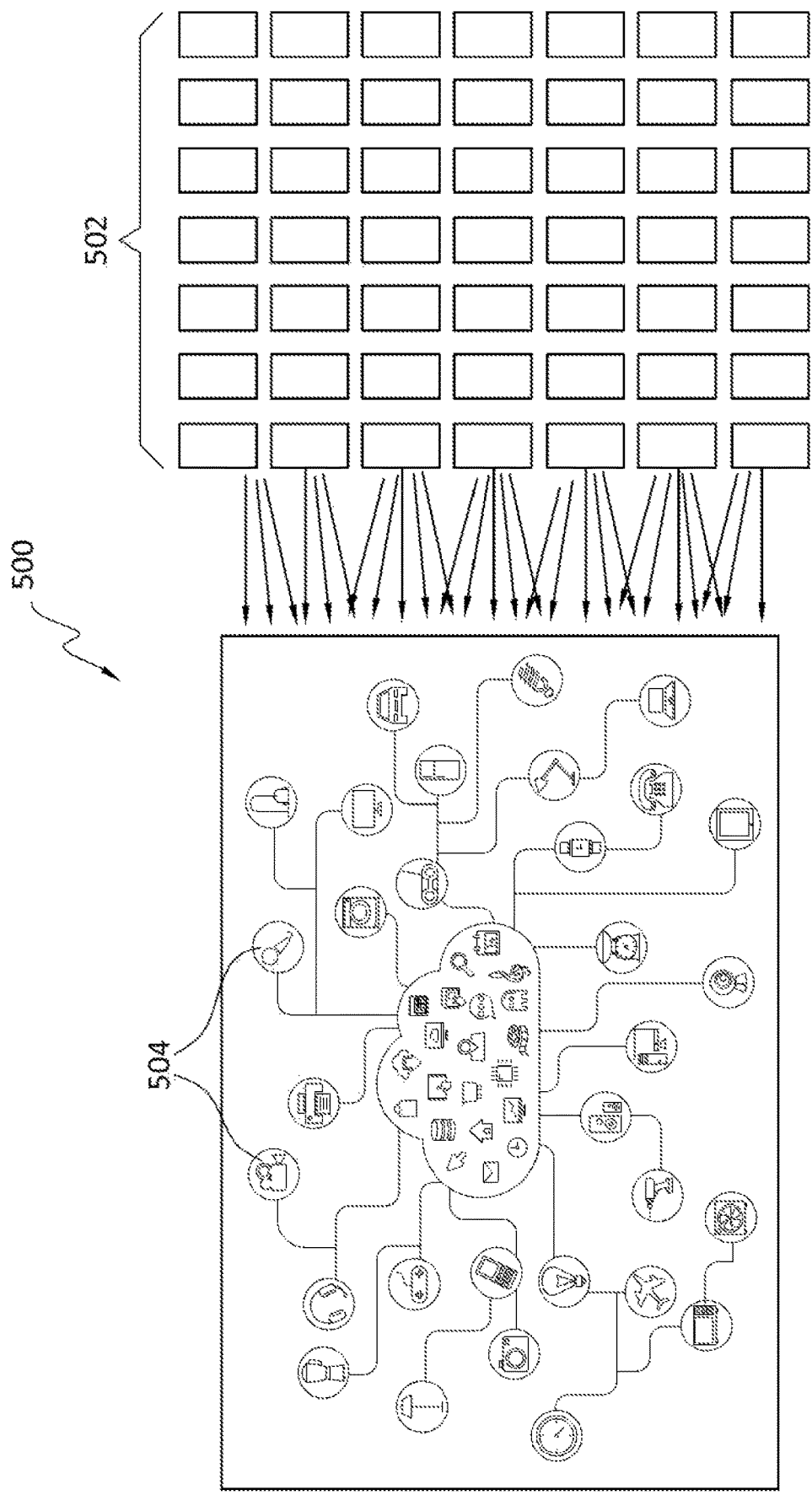
FIG. 5 illustrates the complexity of a DCF multiple configuration file deployment.

The problems described above can, and do, lead to a highly complex, and unwieldy, DCF configuration deployment model. This complexity is illustrated by the example DCF 500 in FIG. 5. Particularly, FIG. 5 discloses the corresponding multitude of different configuration files 502 required to support trust insertion for the various different types of data generators 504 of the DCF 500.

B. Aspects of Some Example Embodiments

In general, some example embodiments of the invention may reduce, or eliminate, DCF configuration file sprawl, that is, a proliferation of configuration files that would otherwise be necessitated by a DCF that includes a variety of different types of data generators. The table 600 of FIG. 6 discloses an approach that may be employed by some example embodiments. Particularly, the table 600 discloses the mapping of a default equation 602 to each different type of data generator 604, which take the form of sensors in table 600. In general, each equation 602 includes one or more data confidence measures that may be applied to data generated by sensors of the corresponding type. Some data confidence measures may be common to one or more different types of data generators 604, and other data confidence measures may be unique to one particular type of data generator 604, or to a subset of data generators 604. The data generators 604, equations 602, and mappings, set forth in the table 600 are presented only by way of illustration and are not intended to limit the scope of the invention in any way. As discussed below, the information presented in the table 600 may enable various useful functionalities.

With continued reference to table 600, and directing attention to FIG. 7 as well, an arrangement is disclosed in which a single equation-based configuration file 702, or simply 'configuration file 702,' may be created and applied across all nodes of a DCF 704, notwithstanding that those nodes may be numerous and may collectively embrace a wide variety of different types of data generators. One reason that a single configuration file 702 may now be used in place of a group of device-specific DCF configuration files (compare FIG. 5) is that each node in the DCF may contain features that leverage the equations in the configuration file 702. The following examples are illustrative.

Figure 8:
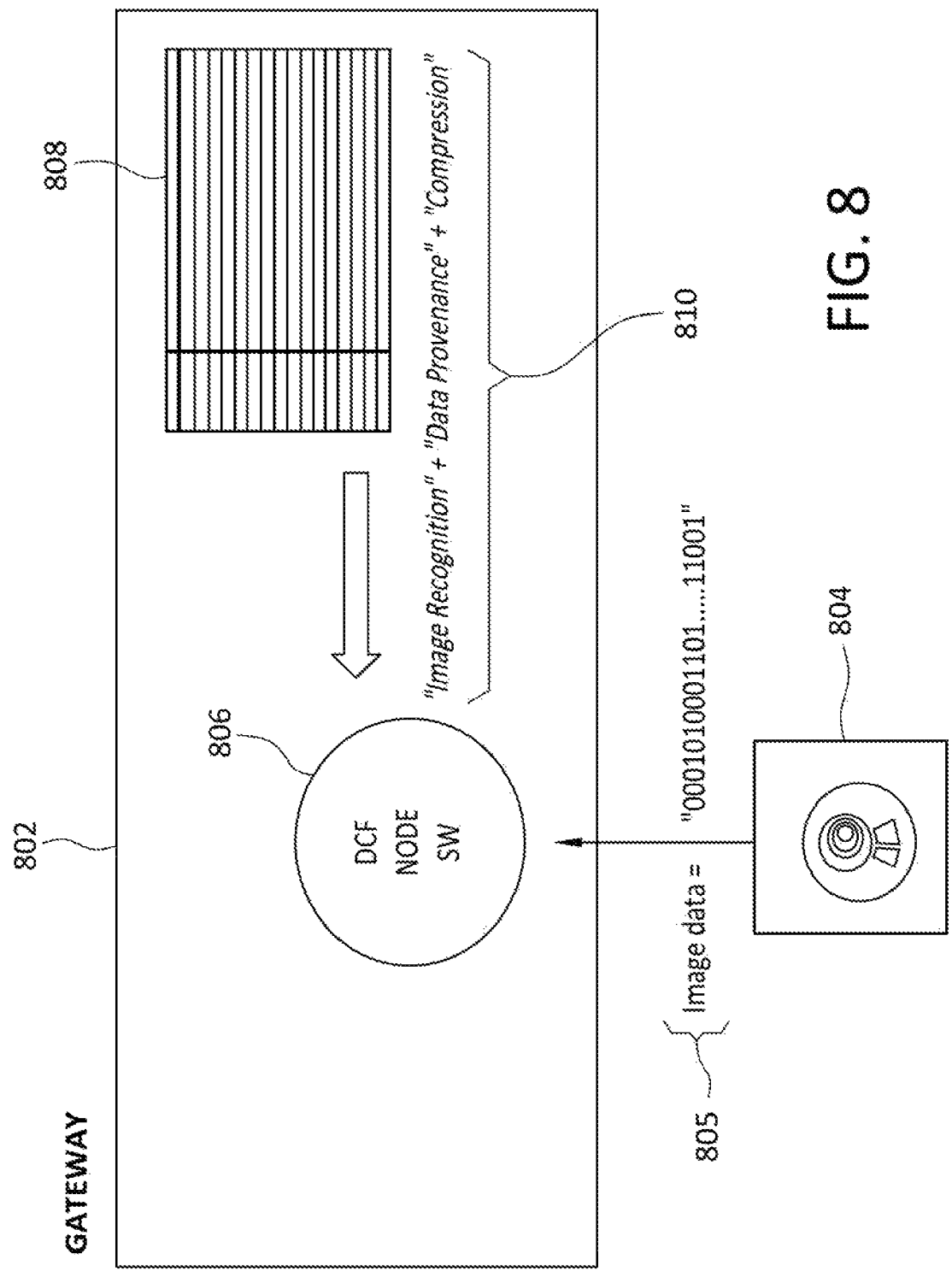
FIG. 8 discloses a dynamic equation mapping based on stream inspection.

At least some example embodiments of the invention may provide dynamic equation mapping based on sensor type. With reference now to FIG. 8 which discloses dynamic equation mapping based on stream inspection, consider an example DCF node 802, such as a gateway, that is interacting with node that comprises a data generator 804 such as a camera. As data 805 streams into the gateway from the camera, the gateway need not have a pre-configured, specific fabric for handling that camera data. Instead, the gateway DCF software 806 may dynamically retrieve, from the equation-based configuration file 808, the entry that applies to the data generator 804.

In more detail, and with continued reference to the example of FIG. 8, the gateway may be running DCF software 806 and has the ability to dynamically recognize the data 805, which may be a still image or video clip in the example case where the data generator 804 comprises a camera, as being transmitted by, and originating with, the data generator 804. The gateway may then call the equation-mapping table of the configuration file 808 and look up they type of DCF handling data from the data generator 804 should receive. In return to the lookup query, the DCF node software 806 may receive the equation 810: "Image Recognition"+"Data Provenance"+"Compression." Thus, the returned equation 810 may comprise instructions to the DCF software 806 as to how to perform trust processing and scoring for the data 805. Thus, as provided by the equation 810, the following operations must be performed by the DCF software 806 in order for the data 805 to be deemed as "fully trustworthy." The equation 810 may, or may not, specify a particular order for performance of the operations contained in the equation 810. The equation 810 may specify that all of the operations be performed, or at least started, at the same time. In any case, the equation 810 specifies that Image Recognition software, which may reside at the same node as the DCF software 806, must be run by the DCF software 806 on the data 805, Data Provenance, such as identification of the node, such as a gateway, that ingested the data 805, must be attached to the data 805 by the DCF software 806, and the data 805, which may be a visual image, must be subjected to data Compression. Finally, it is noted that if the DCF node software 806 is unable to recognize the type and/or content of the data 805, the DCF node software 806 may also be pre-configured to recognize the data generator 804 type, and thereby understand what type of data 805 is being ingested by the DCF node from the data generator 804.

Figure 9:
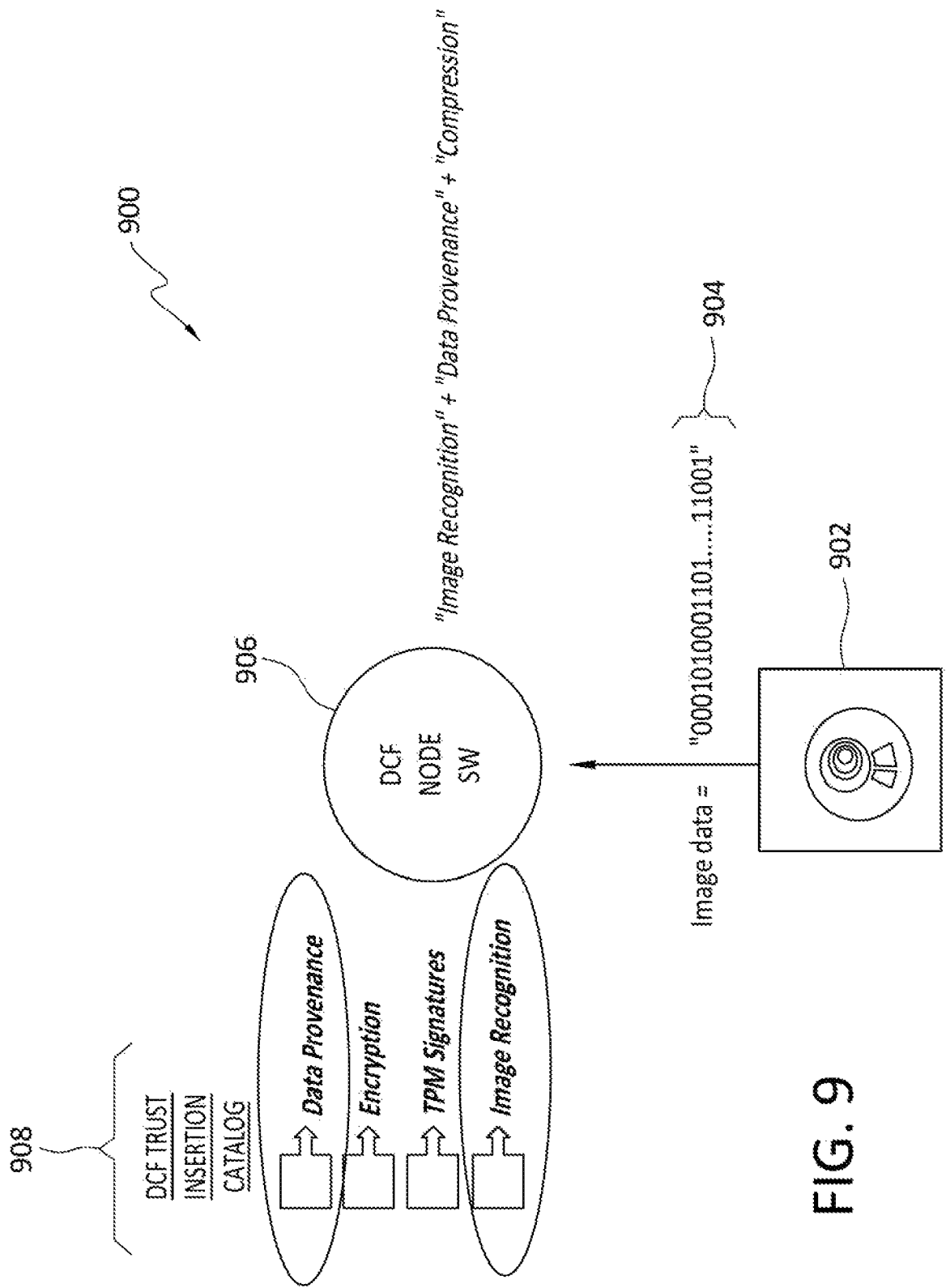
FIG. 9 discloses dynamic location of DCF trust components.

With reference now to FIG. 9, further details are provided concerning the use of an equation-based configuration file. In that Figure, a scheme 900 is disclosed that includes a data generator 902 that communicates data 904 to a DCF node 906 that may be running DCF node software. In general, the example scheme 900 may be configured to dynamically locate DCF trust insertion components. Particularly, once an equation has been identified (see, e.g., FIG. 8), the DCF node software running at the DCF node 906 may determine if the corresponding trust insertion components are locally available. For example, the first element of the example equation discussed in FIG. 8 is Image Recognition. Thus, the DCF node software may inspect a DCF Trust Insertion Component (TIC) catalog 908, which may be locally available and/or present at a remote location, and determine that the Image Recognition DCF component is locally available, that is, available at the DCF node 906. Similarly, the DCF node software may inspect a DCF TIC catalog 908 and determine that the Data Provenance trust insertion component is locally available. As indicated in the example of FIG. 9 however, the Compression DCF component is not locally available. Thus, the DCF node 906 may now execute the local DCF trust insertion components to implement trust insertion operations, that is, Image Recognition and Data Provenance. Note that the DCF TIC catalog 908 may include other locally available trust insertion components that may not be needed for the applicable equation, such as Encryption and TPM Signature for example.

Figure 10:
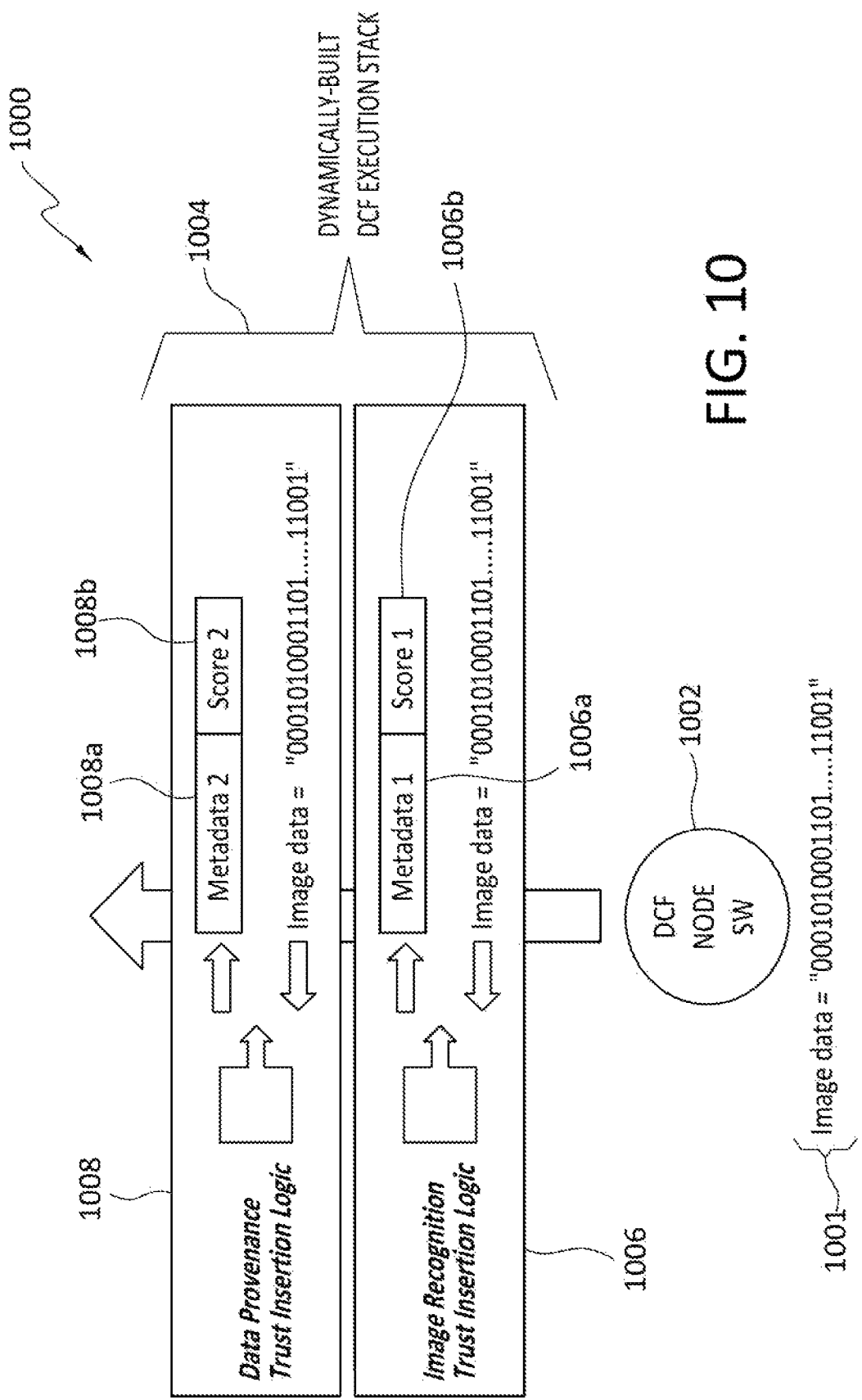
FIG. 10 discloses equation-based dynamic execution of DCF operations.
Figure 11:
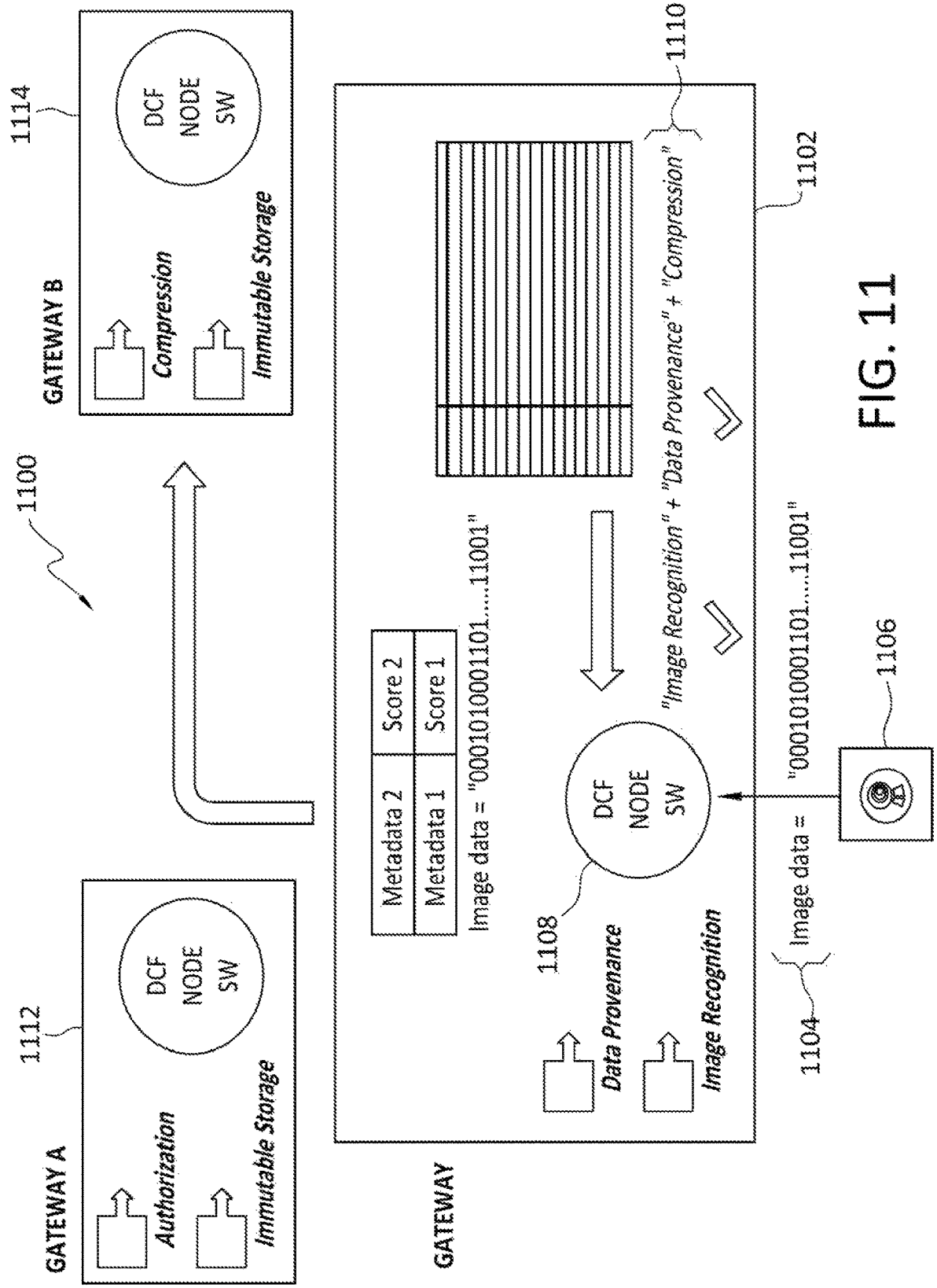
FIG. 11 discloses equation-based DCF pathing

With reference next to FIGS. 10 and 11, details are provided concerning some example approaches for implementing trust insertion operations by trust insertion components that are locally available, such as at a DCF node 906, as well as example approaches for implementing trust insertion operations by trust insertion components that may not be locally available, such as at a DCF node 906.

FIG. 10 discloses an example scheme 1000 for equation-based execution of trust insertion regarding data 1001. Particularly, that Figure discloses dynamic execution, by DCF node software 1002, of Data Provenance and Image Recognition DCF trust insertion operations after the dynamic equation-based location of the components has been completed, such as by the example processes discussed in connection with FIG. 9. In the example of FIG. 10, the DCF node software 1002 may build a DCF execution stack 1004 that includes the two local trust insertion components. Particularly, the DCF execution stack 1004 may include an Image Recognition layer 1006 that comprises the Image Recognition trust insertion component, and a Data Provenance layer 1008 that comprises the Data Provenance trust insertion component. In general, a trust insertion component may comprise logic that is executable by the DCF node software 1002 and/or by other entities. The DCF execution stack 1004 may be built ad hoc when the data 1010 comes into the DCF node where the DCF node software 1002 resides, or may already exist when the data 1010 comes in to the DCF node.

In the example of FIG. 10, the DCF execution stack 1004 is configured so that the data 1001 is routed first to the Image Recognition layer 1006 for processing, and then to the Data Provenance layer 1008, although this order may be reversed in another embodiment. In this illustrative example, the processing of the data at each of the Image Recognition layer 1006 and the Data Provenance layer 1008 results in the generation of respective metadata 1006a and 1008a, and trust scores 1006b and 1008b. The metadata 1006a and 1008a may indicate, among other things, that the processing of the data 1001 has been performed, and may also identify the DCF node where the processing of the data 1001 was performed. The trust scores 1006b and 1008b may indicate, for example, respective relative levels of trustworthiness that has been assigned to the data 1001 based on the outcome of the processing of the data 1001 by the DCF execution stack 1004.

Note that the DCF node software 1002 in FIG. 10 lacks a component of the equation 808 that was retrieved from the configuration 810, discussed in connection with FIG. 8. Particularly, the DCF node software 1002 lacks the Compression component of that equation 808. Directing attention now to FIG. 11, details are provided concerning example approaches for the processing of data when a needed trust insertion component is not locally present.

The example scheme 1100 in FIG. 11 may include a DCF node 1102, such as a gateway for example, that receives a data stream 1104 from a data generator 1106. In this example, the DCF node software 1108 at the DCF node 1102 may be able to process the data stream 1104 for Image Recognition and Data Provenance, but may not have, locally at the DCF node 1102, the logic needed to process the data for Compression. Thus, in the example of FIG. 11, two parts of the equation have been satisfied, as indicated by the check marks underneath Image Recognition and Data Provenance, but the third component, Compression, is not locally available and is thus shown as unchecked in FIG. 11.

In the example of FIG. 11, the DCF Node software 1108 may parse the equation 1110 to identify the components of the equation 1110, and then perform a search to find a DCF node that can satisfy a request to perform the operations corresponding to the Compression element of the equation 1110, that is, a DCF node that has a local copy of the logic needed to evaluate the compression of the data 1104 for trustworthiness.

Because the Compression logic is not locally available at the DCF node 1102, in this illustrative example, the DCF node software 1108 may communicate with one or more other DCF nodes 1112 and 1114, which may or may not be located nearby the DCF node 1102, to determine which of those DCF nodes may support equation-based trust insertion operations. In the example of FIG. 11, the DCF node 1102 has determined that DCF node 1112 does not support equation-based trust insertion, or has determined that while the DCF node 1102 does support equation-based trust insertion, the DCF node 1102 lacks the particular logic to perform Compression trust insertion. However, DCF node 1114 does support Compression related trust insertion, and so the data 1104 and existing DCF metadata, respectively relating to Image Recognition and Data Provenance trust insertion operations performed by the DCF node software 1108 at the DCF node 1102, may be forwarded from the DCF node 1102 to the DCF node 1114 for processing. The DCF node 1114 may then perform, with respect to the data 1104, the Compression trust insertion operations.

Figure 12:
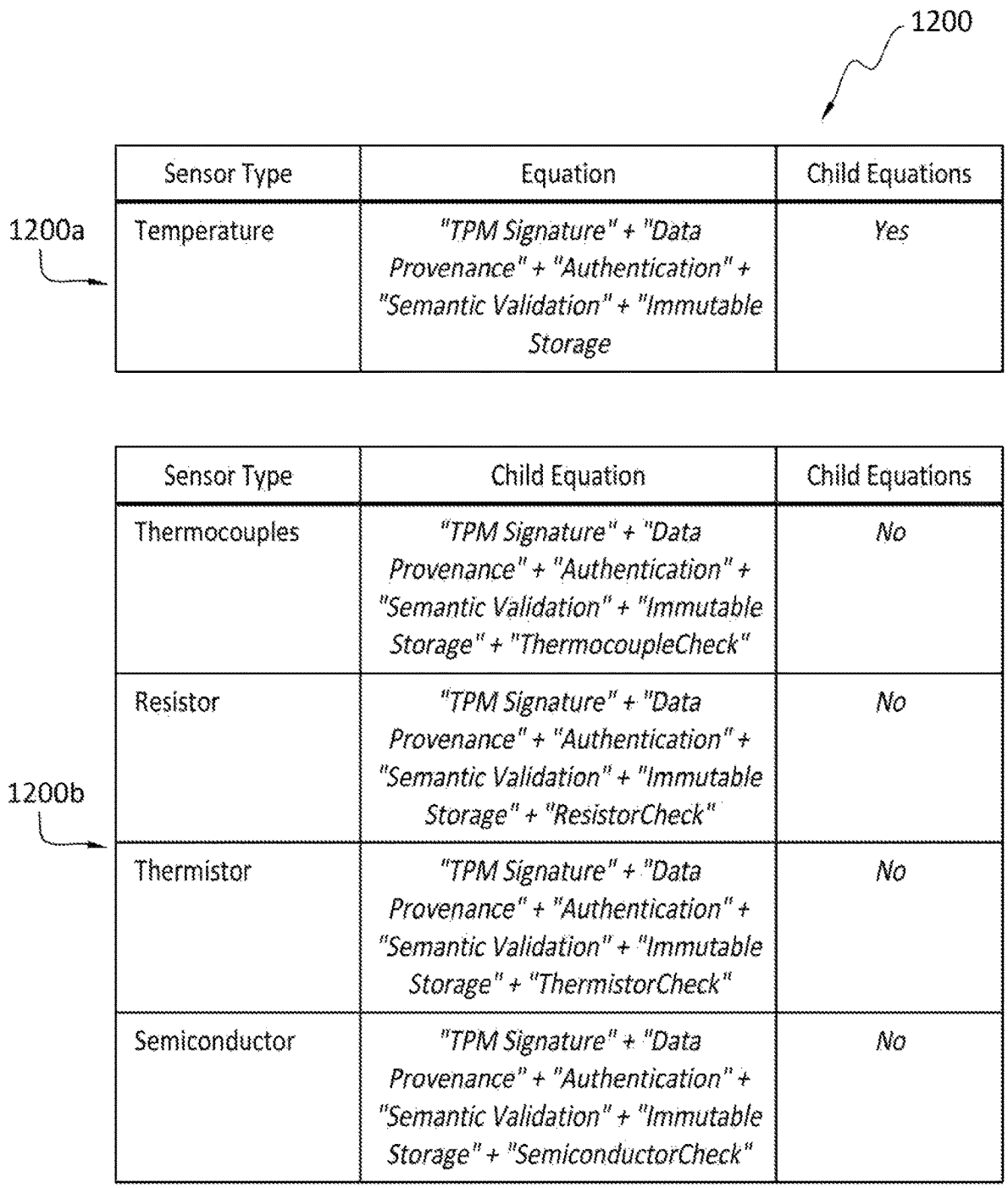
FIG. 12 discloses a child equation scheme based on data generator classification.

With reference now to the example table 1200 in FIG. 12, it may sometimes be the case that a data stream is generated by a data generator of a type that is unknown to one, some, or all, of the other nodes of a DCF. Thus, when a new data stream that is mapped to an unknown device arrives into a node of a DCF, such as a gateway running DCF node software for example, a default equation may initially be assigned to that data stream. By way of example, and with brief reference back to the table 600, the last row of that table 600 contains the following equation: ("GPS augmentation"+"Data Provenance")/10. If the unknown data stream is mapped to this equation, at the very least the data stream is associated, possibly permanently, with GPS data and Data Provenance. Note that the data confidence score calculated after executing those two trust insertion components may then be divided by ten, which yields a much lower score than had the two data confidence scores simply been summed together without any subsequent division. The relatively low score that results after the sum of the two confidence scores has been divided by ten implies that the confidence in the data stream is low because the data is essentially unknown, that is, the data originates from a data generator of unknown type and/or other unknown characteristics. Thus, only minimal trust insertion, that is GPS and Data Provenance in this example, may be performed in such circumstances.

With continued reference to the table 1200, if a data stream is known, that is, the data stream originates from a data generator having one or more known characteristics, such as device type for example, the equation corresponding to that data stream may be looked up in table, such as the table 1200. As well, when the data stream is coming from a device whose specific type, and/or other characteristic(s), is known, the device may be further classified into one of the four different types of temperature sensors indicated, then the table may point to Child Equations of that device type, as shown in the example case of sensor types in table 1200.

Particularly, it is noted that a column, Child Equations, is included in the first part 1200a of the table 1200. Where the particular type of temperature sensor is unknown, the default equation applied to data generated by that temperature sensor may be the Equation in the first part 1200a. That is, the default equation may be applied to data generated by the generic temperature sensor. However, where the particular type of temperature sensor is known, the Child Equations may include a respective equation for each different type of temperature sensor. In this case, the Equation for the generic temperature sensor need not be employed, and a sensor type-specific, or sub-type, Child Equation may be used instead as the basis for processing the data generated by a particular type of temperature sensor. In effect, the applicable Child Equation may override the default Equation when the sensor type is known. As the Child Equation may differ from the default Equation, the trust insertion processes, and consequent trust scores, may be tuned to accommodate the specific type of sensor that generated the data that is to be evaluated for trust.

Although some of the examples disclosed herein involve execution of equation-specified trust insertion processes in a particular order, such as left-to-right as viewed from the perspective of a particular equation, the scope of the invention is not so limited. For example, and with reference to the Accelerometer of table 600, the Equation specifies performance of GPS Augmentation, and then Data Provenance. However, these trust insertion processes are not required to be performed in that order. Thus, for example, in another embodiment involving an Accelerometer, the Data Provenance trust insertion may be performed first, followed by performance of the GPS Augmentation trust insertion. Correspondingly, the layers in a DCF execution stack, such as the example DCF execution stack 1004, need not necessarily be arranged in any particular way. Thus, in another embodiment of the DCF execution stack 1004, the Data Provenance layer 1008 may be the bottom layer, and the Image Recognition layer 1006 may be the top layer. In still other embodiments, DCF trust insertion processes may be performed according to the format of the associated Equation. To illustrate with an example, an Equation might have the form (where TI refers to a trust insertion process): ((TI2+TI3), (TI5), (TI1+TI4)). In this example, TI2 and TI3 may be performed together, or in order where TI2 is performed before TI3, but in either case, TI2 and TI3 are both performed before TI5 for example, and before TI1 and TI4. It will be appreciated that an endless variety of equation formats may be defined and employed in various embodiments of the invention.

C. Data

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

D. Example Methods

Figure 13:
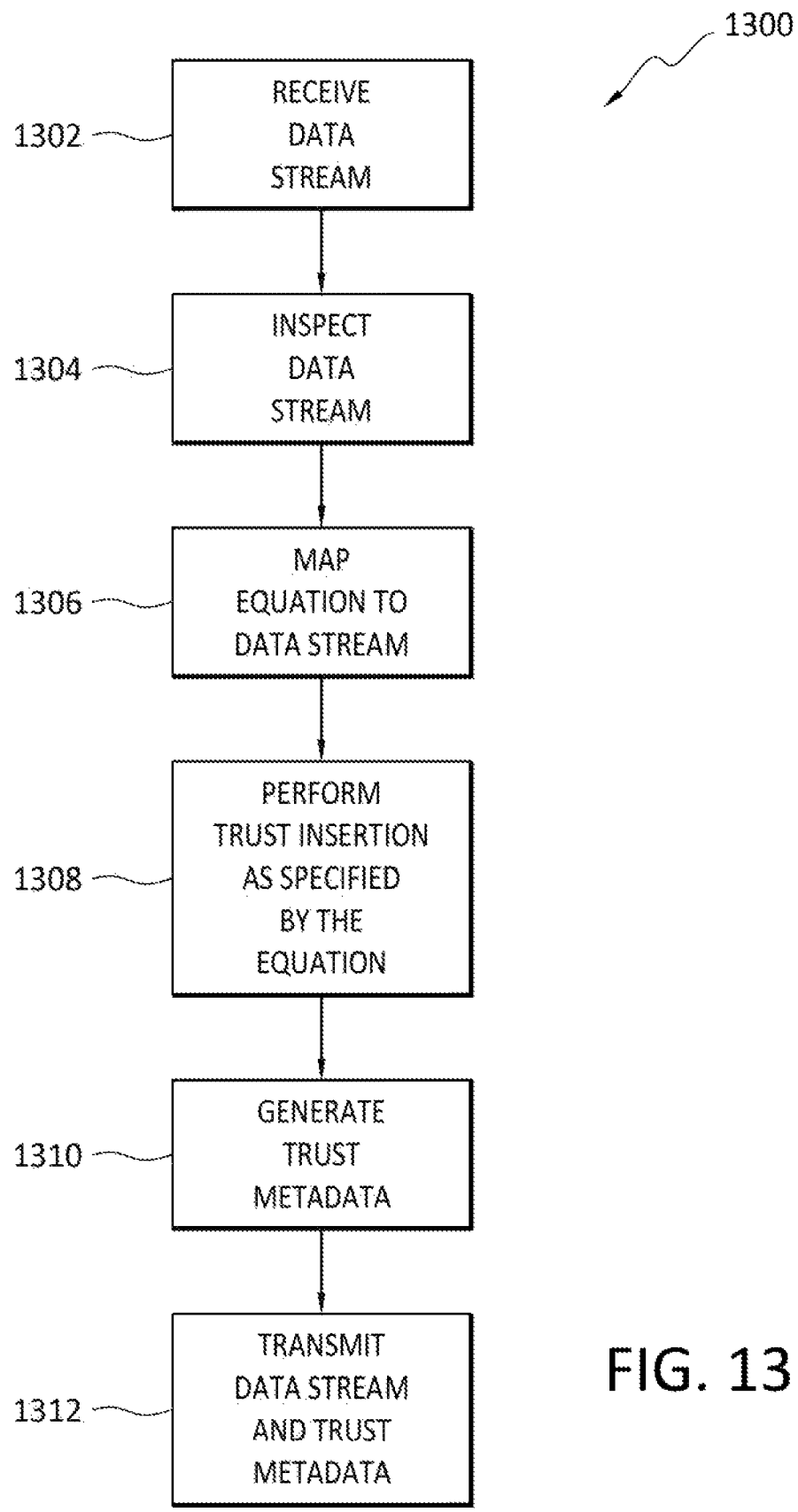
FIG. 13 discloses aspects of an example method.

It is noted with respect to the example method 1300 of FIG. 13 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Directing attention now to FIG. 13, the example method 1300 may be performed, in part or in whole, at a node of a DCF. In some embodiments, the node may be a gateway, but that is not required. Examples of DCFs in connection with which the method 1300 may be employed are disclosed herein.

The example method 1300 may begin at 1302 when a data stream generated by a data generator is received at a node of a DCF. The DCF may comprise, for example, 10s, 100s, or even 1000s, of nodes, arranged in a multi-tier structures. The nodes may collectively comprise data generators of a wide variety of different types. In some examples, a single DCF may include up to 100, or more, different types of data generators.

The data stream may be inspected 1304 by the receiving node in order that the node can determine the nature of the data in the data stream and, correspondingly, the type of data generator that generated the data. Alternatively, the inspection 1304 may reveal that the data is of an unknown type and, correspondingly, the associated data generator is of an unknown type as well. In some cases, stream inspection 1304 may be performed automatically by the receiving node in response to receipt of the data by that node.

Regardless of whether the data type is determined to be known, or not, an equation may then be mapped 1306 to the data stream. The equation may specify, for example, one or more different trust insertion processes that are to be performed with regard to the data. In general, a trust insertion process may involve evaluating the data according to particular criteria specified by the trust insertion process, and then assigning a confidence score to the data based on the outcome of the evaluation.

After an equation has been mapped 1306 to the data stream, the trust insertion process(es) specified by the equation may then be performed 1308 with respect to the data. Examples of various trust insertion processes may be found, for example, in the table 600. In conjunction with performance of the trust insertion processes 1308, various trust metadata may be generated 1310. To briefly illustrate, if the process 1308 reveals that the data originated from an authenticated source, trust metadata, such as in the form of a data confidence score for example, may be generated 1310 that indicates a relatively high level of trust in the data, since that data originated from an authenticated source. Data confidence scores may range, for example, from 0 (no confidence) to 1.0 (full confidence). In the authentication example just noted, a data confidence score of 1.0 may be assigned as a result of performance of the process 1308. On the other hand, if it could not be determined whether the data originated from an authenticated source, a relatively low data confidence score, such as 2.0 or 3.0 for example, may be assigned to the data as a result. This non-zero score may reflect that fact that while the data source was not authenticated, it also was not conclusively established that the data stream originated from a bad actor such as a hacked device, which might necessitate a score of 0. In some instances, a score of 0, or within a specified range from 0, may stop further transmission of the data to other nodes of the DCF, and may be reported to a DCF authority, such as an administrator, for action, which could include disabling and removal of the hacked device.

After the trust metadata has been generated 1310, the trust metadata may be appended to the data of the data stream, and the data and trust metadata transmitted 1312, such as to one or more other nodes of the DCF. These nodes may, or may not, be in the same tier as the node that performed the processes 1302-1310.

E. Further Example Embodiments

Following are some further example embodiments of the invention. These are presented only by way of example and are not intended to limit the scope of the invention in any way.

Embodiment 1. A method, comprising: receiving a data stream at a node of a data confidence fabric that comprises a plurality of nodes that are each operable to assign trust metadata to data of the data stream; inspecting the data stream to determine a data type of data in the data stream; accessing a configuration file that applies to the plurality of nodes of the data confidence fabric, and obtaining an equation from the configuration file; mapping the equation to the data; performing a trust insertion process on the data, as specified in the equation; and generating trust metadata that is associated with the data and based on the trust insertion process.

Embodiment 2. The method as recited in embodiment 1, wherein the trust metadata comprises a data confidence score.

Embodiment 3. The method as recited in any of embodiments 1-2, wherein each node in the plurality of different nodes comprises a different respective type of data generator.

Embodiment 4. The method as recited in any of embodiments 1-3, wherein the configuration file comprises a different respective equation for each type of data generator in the data confidence fabric.

Embodiment 5. The method as recited in any of embodiments 1-4, wherein the equation is a child equation that corresponds to a sub-type of a data generator that generated the data stream.

Embodiment 6. The method as recited in any of embodiments 1-5, wherein the trust insertion process is performed locally at the node that received the data stream.

Embodiment 7. The method as recited in any of embodiments 1-6, wherein the trust insertion process is performed at a node remote from the node that received the data stream, and the node at which the trust insertion process is performed is identified by a query performed by the node that received the data stream.

Embodiment 8. The method as recited in any of embodiments 1-7, further comprising parsing the equation to identify trust insertion processes specified by the equation, and building a data confidence fabric execution stack based on results of the parsing.

Embodiment 9. The method as recited in any of embodiments 1-8, wherein the equation specifies another trust insertion process, and the method further comprises performing the another trust insertion process on the data.

Embodiment 10. The method as recited in any of embodiments 1-9, further comprising appending the trust metadata to the data.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 14:
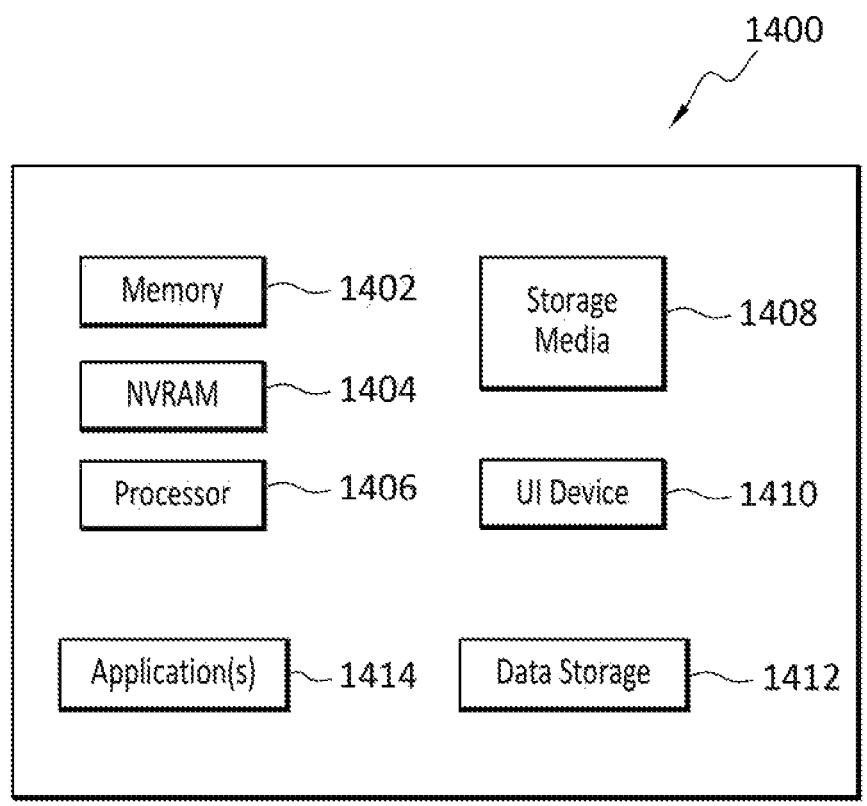
FIG. 14 discloses aspects of an example computing entity configured to perform the disclosed methods and operations.

With reference briefly now to FIG. 14, any one or more of the entities disclosed, or implied, by FIGS. 1-13 and/or elsewhere herein, may take the form of, or include, or be implemented on, or hosted by, a physical computing device, one example of which is denoted at 1400. As well, where any of the aforementioned elements comprise or consist of a virtual machine (VM), that VM may constitute a virtualization of any combination of the physical components disclosed in FIG. 14.

In the example of FIG. 14, the physical computing device 1400 includes a memory 1402 which may include one, some, or all, of random access memory (RAM), non-volatile memory (NVM) 1404 such as NVRAM for example, read-only memory (ROM), and persistent memory, one or more hardware processors 1406, non-transitory storage media 1408, UI device 1410, and data storage 1412. One or more of the memory components 1402 of the physical computing device 1400 may take the form of solid state device (SSD) storage. As well, one or more applications 1414 may be provided that comprise instructions executable by one or more hardware processors 1406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

receiving a data stream at a node of a data confidence fabric that comprises a plurality of nodes that are each operable to assign trust metadata to data of the data stream;

inspecting the data stream to determine a data type of data in the data stream, wherein the data type indicates a type of data generator that generated the data;

accessing a configuration file that applies to the plurality of nodes of the data confidence fabric and includes an equation column based on a data type and a child equation column based on a subtype of the data type;

in a case when a subtype of the data type is not identified in the configuration file, mapping an equation in an equation column based on the data type to the data;

in a case when a subtype of the data type is identified in the configuration file, mapping a child equation in a child equation column based on the subtype of the data to the data;

performing a trust insertion process on the data, as specified in the mapped equation; and generating trust metadata that is associated with the data and based on the trust insertion process.

2. The method as recited in claim 1, wherein the trust metadata comprises a data confidence score.

3. The method as recited in claim 1, wherein each node in the plurality of nodes comprises a different respective type of data generator.

4. The method as recited in claim 1, wherein the configuration file comprises a different respective equation for each type of data generator in the data confidence fabric.

5. The method as recited in claim 1, wherein the trust insertion process is performed locally at the node that received the data stream.

6. The method as recited in claim 1, wherein the trust insertion process is performed at a node remote from the node that received the data stream, and the node at which the trust insertion process is performed is identified by a query performed by the node that received the data stream.

7. The method as recited in claim 1, further comprising parsing the mapped equation to identify trust insertion processes specified by the mapped equation, and building a data confidence fabric execution stack based on results of the parsing.

8. The method as recited in claim 1, wherein the mapped equation specifies another trust insertion process, and the method further comprises performing the another trust insertion process on the data.

9. The method as recited in claim 1, further comprising appending the trust metadata to the data.

10. A non-transitory storage medium having stored therein instructions that are executable by one or more hardware processors to perform operations comprising:

receiving a data stream at a node of a data confidence fabric that comprises a plurality of nodes that are each operable to assign trust metadata to data of the data stream;

inspecting the data stream to determine a data type of data in the data stream, wherein the data type indicates a type of data generator that generated the data;

accessing a configuration file that applies to the plurality of nodes of the data confidence fabric and includes an equation column based on a data type and a child equation column based on a subtype of the data type;

in a case when a subtype of the data type is not identified in the configuration file, mapping an equation in an equation column based on the data type to the data;

in a case when a subtype of the data type is identified in the configuration file, mapping a child equation in a child equation column based on the subtype of the data to the data;

performing a trust insertion process on the data, as specified in the mapped equation; and generating trust metadata that is associated with the data and based on the trust insertion process.

11. The non-transitory storage medium as recited in claim 10, wherein the trust metadata comprises a data confidence score.

12. The non-transitory storage medium as recited in claim 10, wherein each node in the plurality of nodes comprises a different respective type of data generator.

13. The non-transitory storage medium as recited in claim 10, wherein the configuration file comprises a different respective equation for each type of data generator in the data confidence fabric.

14. The non-transitory storage medium as recited in claim 10, wherein the trust insertion process is performed locally at the node that received the data stream.

15. The non-transitory storage medium as recited in claim 10, wherein the trust insertion process is performed at a node remote from the node that received the data stream, and the node at which the trust insertion process is performed is identified by a query performed by the node that received the data stream.

16. The non-transitory storage medium as recited in claim 10, wherein the operations further comprise parsing the mapped equation to identify trust insertion processes specified by the mapped equation, and building a data confidence fabric execution stack based on results of the parsing.

17. The non-transitory storage medium as recited in claim 10, wherein the mapped equation specifies another trust insertion process, and the operations further comprise performing the another trust insertion process on the data.

18. The non-transitory storage medium as recited in claim 10, wherein the operations further comprise appending the trust metadata to the data.

* * * * *